Patented Mar. 15, 1949

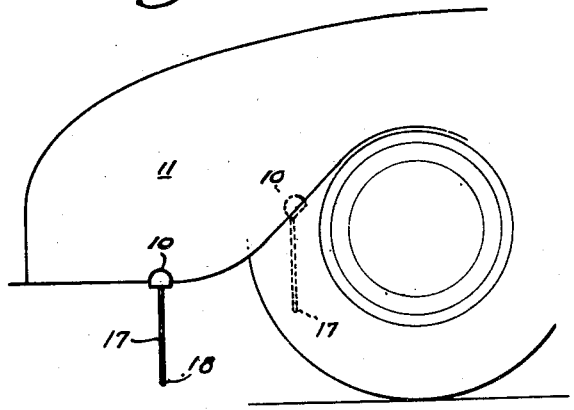
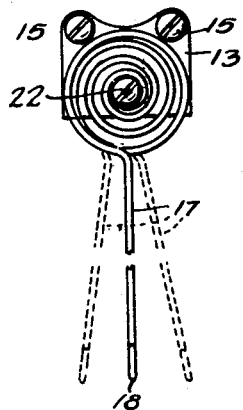
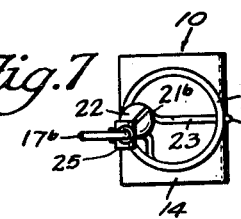
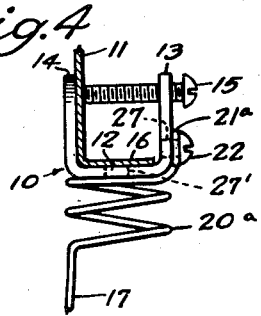
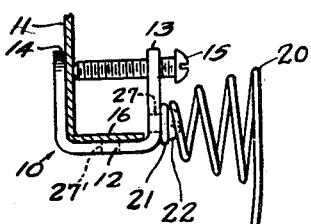
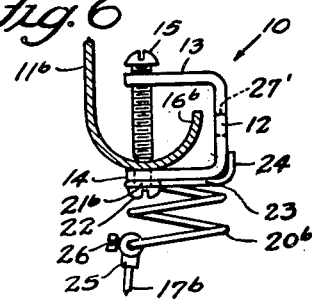
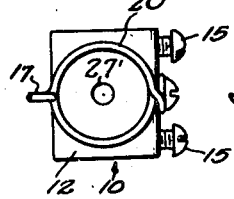
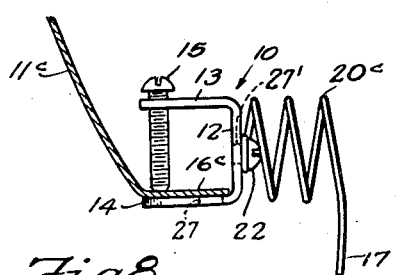

2,464,365

UNITED STATES PATENT OFFICE 2,464,365

CURBING SIGNAL

Fred J. Aves, Beverly Hills, Calif.

Application June 30, 1947, Serial No. 758,118

4 Claims. (Cl. 116—28)

This invention relates to a device, attachable to an automobile, for indicating the nearness of a curbing or similar obstruction during parking operations. The invention is particularly applicable to that class of devices for this purpose, which are adapted to utilize vibrations set up by scraping contact with a curb, or other obstruction, to mechanically produce an audible signal within the vehicle.

One of the objects of my invention is to provide such a device having improved sound producing characteristics.

A further object is to provide such a device which is relatively simple and inexpensive in construction.

Another object is to provide such a device which is adaptable to attachment to various parts of vehicle structure.

Other objects will become apparent in the ensuing specification and appended drawings in which:

Fig. 1 is a side view of a fender with my improved alarm device attached thereto, shown in full lines in one position and in dotted lines in an alternate position;

Fig. 2 is a rear view of the alarm device;

Fig. 3 is a transverse sectional view through portions of a curbing and an adjacent automobile fender, with my invention attached to the lower edge of the fender and engaging the curbing;

Fig. 4 is a sectional view of my warning device, in a different position of adjustment, attached to a fender;

Fig. 5 is an inverted plan view of the device of Fig. 4;

Fig. 6 is a sectional view of a fender with another modified form of my warning device attached thereto;

Fig. 7 is an inverted plan view of the device 6;

Fig. 8 is a section view of a fender with a modified form of the invention attached thereto; and Fig. 9 is a detail of a modified form of the curb engaging tip.

As an example of one form in which my invention may be embodied, I have shown in Figs. 1 to 3 inclusive of the drawings, a curb indicating device including a clamp 10 adapted to be attached to the flanged lower extremity of an automobile fender 11, or to a bumper, bumper brace, or other conveniently located part of a vehicle. The clamp 10 comprises a U-shaped yoke including a web portion 12 and legs 13 and 14 disposed at right angles to the web portion 12. When the clamp is applied to a fender in the manner shown in Fig. 1, the leg 14 engages the outer face of the fender 11 near the flanged lower extremity thereof, and is clamped thereagainst by a pair of screws 15 which are threaded through the leg 13. The screws 15, being spaced from the web 12, will clear the flanged portion 16 of the fender. The legs 13 and 14 are spaced sufficiently to straddle the flange 16.

Attached to the clamp 10 is one end of a resilient wire antenna 17. The other end of the antenna 17 is provided with a tip in the form of a small closed loop 18 (or ball 18a—Fig. 9), which is adapted to engage a curb 19 or other obstruction. The antenna 17 projects downwardly and outwardly in a plane transverse to the longitudinal axis of the vehicle, its tip 18 being disposed outwardly of the side of the vehicle and sufficiently low to make contact with a curb.

The upper end of the antenna 17 is connected to the clamp 10 through an open coil spring 20. That is, as shown in the drawing, the coil has a spiral pitch great enough to space its whorls from contacting each other, so that one does not tend to interrupt or damp the vibrations of another. It is my preference to have the antenna extend from the outer end of the coil diagonally downwardly and outwardly at an acute angle to the longitudinal axis of the coil and at an acute angle to a perpendicular obstruction surface such as a curb. By so disposing the antenna, when it encounters a curb or other obstruction, it tends to laterally flex the coil instead of merely tending to unwind it as would be the case if it extended at a right angle, and moreover the antenna will always engage the obstruction surface at such angle so that the engagement will not merely exert axial pressure on the antenna, which latter would result in failure to produce any appreciable signal. A preferred type of spring is the half-barrel (roughly conical) type shown in Fig. 3. The antenna 17 and spring 20 are preferably constructed from spring material such as piano wire.

The spring 20 functions to provide sufficient yieldability in the mounting of the antenna so that it becomes impossible for the antenna to become permanently deformed when deflected by an obstruction, no matter how great the deflection. The coil spring 20 also functions to amplify the sound that is produced. I find that the sound produced by a wire antenna connected directly to the fender with the spring 20 omitted, has considerably less volume than that produced by the device as shown herein. Also, where the coils of the spring 20 are tight together, the volume of the sound is definitely diminished or substantially completely damped.

The antenna 17 and spring 20 become a resonant body when excited by scraping contact with a curb or other obstruction. As an essential factor in the production of the sound, the clamp 10 must be securely clamped to a member of the vehicle so that the captive end of the spring is tightly held. When thus mounted, the device will produce a sound that is clearly audible within a closed vehicle, whether the device is attached to a fender, or to a bumper bracket or other part, although where it is attached to a fender, the fender will tend to become resonant also and to amplify the sound within the vehicle to some extent.

The parts of the antenna 17 will vibrate in paths parallel to the face of the side of the vehicle, as indicated by the dotted lines in Fig. 2. The vibration of the spring 20 will be a torsional vibration.

Another important function of the spring 20 is to permit the antenna 17 to yield upon contact with a curbing, without diminishing its vibration characteristics. The spring 20 may be distorted by bending of its axis so as to allow the antenna 17 to be shifted toward the vehicle. This distortion of the spring does not materially alter its natural period of vibration, whereas the flexing of the antenna itself, inducing tension therein, would do so.

The spring 20 is provided with an eye 21 through which a screw 22 is passed and threaded into the arm 13 in order to secure the spring to the bracket. By sufficiently tightening the screw 22, the eye 21 may be securely clamped between the head of the screw and the arm 13 so as to lock the antenna in a selected position of adjustment circumferentially about the axis of the screw. Such adjustment may be desirable in order to allow the bracket 10 to be disposed in either a horizontal position as shown in full lines in Fig. 1, or in an inclined position as shown in dotted lines in Fig. 1, with the antenna projecting downwardly in a vertical plane in either instance. The arrangement of the spring 20 in the position shown in Figs. 2 and 3, with its axis horizontal and transverse to the plane of the fender, makes possible such angular adjustment. It also provides for the torsional type of vibration, which is very effective in achieving maximum amplitude of sound. It also provides for locating the spring on the inner side of the fender, concealed from view.

I find the conical type of coil which I prefer to provide a distinctly better signal. However, as best shown in Fig. 3, it is desirable that the whorl next adjacent the inner end whorl be of sufficiently greater diameter normally to prevent it from contacting the head of the attaching screw 22, since such contact would tend to interrupt the vibration and resonance.

The spring may be arranged with its axis vertical as shown in Fig. 4. In this modification of the invention, the spring 20a is of cylindrical shape and has an eye 21a which is bent in a plane at right angles to the plane of the end loop of the spring and tangent to one side thereof, so as to permit the loop to be fastened to the arm 13 while the end loop rests against the web portion 12 of the bracket 10. In this case, the spring 20a vibrates by bending of its axis, and the coils of the spring are sufficiently open so that they will not contact each other during such bending, no matter how violent the vibration may be.

The bracket 10 is provided with a threaded opening 27 in either the arm 13 or the arm 14, and a threaded opening 27' in the web 12, to receive a screw 22 in either of two alternate points of attachment of the spring 20 to the bracket. The attachment to the arm 13 is indicated in Fig. 3, and the attachment to the web 12 is indicated in Fig. 8. This makes it possible for the bracket to assume either the horizontal position shown in Fig. 3 or the vertical position shown in Fig. 8. In either case, the antenna may be adjusted angularly about the axis of the screw 22, thus providing for universal adjustment.

One of the features of the invention is that it provides a device which may be adjusted to function, not only as an obstruction indicator but also as a means to indicate (by scraping against the pavement) when a vehicle is being subjected to excessive lateral tilting forces arising, for example, from proceeding too rapidly around a curve.

Where the lower extremity of a fender 11b has a rolled flange 16b as shown in Fig. 6, curled upwardly too high to permit the screw 15 to clear it in the position of the bracket 10 shown in Fig. 3, the bracket may be positioned vertically as shown in Fig. 6, with the screw 15 entering the channel of the flange 16b and clamping it against the leg 14. The spring 20b is, in this case, secured by a screw 22 to the flange 14, with its axis vertical.

Fig. 6 also shows an alternate arrangement for securing the spring to the bracket, in which the end coil of the spring 20b is provided with an eye 21b and, extending beyond the eye 21b, an arm 23, the end of which is bent to form a finger 24 that engages the web portion 12 of the bracket to restrain rotation of the arm 23 about the screw 22.

The antenna is preferably an integral extension of the spring as shown in Figs. 3 and 4. However, it is possible to utilize a separate antenna 17b, as shown in Fig. 6, and to connect it to the spring 20b by a coupling elbow 25. By clamping the elbow 25 to the free end of the coil 20b by means of a set screw 26, provision for adjustment of the antenna 17b toward or away from the curb, without bending the spring or antenna, is made.

The spring 20 of Fig. 3 may, if desired, be of cylindrical shape, and may be attached to the web of the bracket instead of an arm, with the bracket in the vertical position, as shown in Fig. 8, wherein the spring is indicated by the reference numeral 20c and all other parts are indicated by the same numerals as in Fig. 3.

Fig. 8 also illustrates how the bracket may be utilized in the vertical position in order to make possible its attachment to a fender 11c, the lower portion of which slopes downwardly and inwardly as shown in Fig. 8.

I claim:

1. A device for attachment to an automobile fender to signal too close approach to an obstruction, comprising: a flexible, resonant rod having a coiled inner end portion with the contiguous whorls of said coil spaced from each other and a relatively straight elongated antenna-like outer end portion extending laterally from the outer end of the coiled portion at an acute angle to the longitudinal axis thereof adapted to have scraping contact with said obstruction, and fastener means for securing the inner end of the coiled portion to a fender.

2. An alarm device for producing through the fender of a vehicle a resonant signal warning of approach to a street curb or like obstruction, comprising a metallic bracket arranged to be firmly secured to said fender, and a resonant, flexible wire having an openly convoluted portion at its inner end with the contiguous whorls of said coil spaced from each other and having projecting from the outer end of said convoluted portion a relatively long, antenna-like outer end portion whose outer extremity is disposed outwardly from said fender for scraping engagement with said obstruction and thereby to create a resonant vibratory signal; the bracket being firmly secured to the inner extremity of the openly convoluted portion of said wire and supporting said wire therefrom in a position free of sound damping obstruction between its ends whereby to provide substantially unobstructed transmission of the signal through the bracket to said fender.

3. An alarm device for producing through the fender of a vehicle a resonant signal warning of approach to a street curb or like obstruction, comprising a metallic bracket arranged to be firmly secured to said fender, and a resonant, flexible wire having an unrestricted conical spirally coiled portion at its inner end and having projecting from the outer end portion of said coiled portion a relatively straight antenna-like outer end portion whose outer extremity is disposed for scraping engagement with said obstruction whereby to create a resonant, vibratory signal; the apex of the coiled portion being disposed toward the bracket, and attaching means firmly securing the apex extremity only of the wire to the bracket to permit unrestricted movement of the coiled portion; the spiral pitch of the coiled portion being sufficiently great to space contiguous whorls from contact with each other and to space the whorl next adjacent the apex from contact with the attaching means.

4. In a vehicle having a resonant side fender presenting an inturned lower edge portion, an alarm device for producing through said fender a resonant signal warning of approach of said fender to a curb or like obstruction, comprising a metallic bracket carrying means for firmly attaching it to said inturned portion of said fender inwardly from the outer surface of said fender, and a resonant, flexible wire having an openly coiled inner end portion with the contiguous whorls of said coil spaced from each other and a relatively straight, antenna-like outer end portion projecting from the outer end of said coiled portion; said bracket being firmly attached to the inner extremity of the openly coiled portion of said wire and supporting said wire free of contact with any element of said vehicle, with said coiled portion being disposed inwardly from the outer surface of said fender and with its antenna-like portion disposed at an acute angle to a horizontal plane taken through the bracket, whereby to cause the outer end of the antenna-like portion to scrapingly engage said obstruction at an acute angle to the vertical, to prevent axial compression of said portion, and whereby to protect the coiled portion against engagement by extraneous objects against which the outer surface of said fender may scrape.

FRED J. AVES.

REFERENCES CITED

The following references are of record in the file of this patent:

UNITED STATES PATENTS

| Number | Name | Date |
| --- | --- | --- |
| 2,035,880 | Goodale | Mar. 31, 1936 |
| 2,141,844 | Reznor | Dec. 27, 1938 |
| 2,183,438 | Zaiger | Dec. 12, 1939 |
| 2,238,306 | Braswell | Apr. 15, 1941 |